United States Patent
Arai et al.

(10) Patent No.: US 8,699,096 B2
(45) Date of Patent: Apr. 15, 2014

(54) IMAGE FORMING APPARATUS

(75) Inventors: Nobuyuki Arai, Kanagawa (JP);
Yoshinori Hayashi, Kanagawa (JP);
Masako Yoshii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1094 days.

(21) Appl. No.: 12/326,473

(22) Filed: Dec. 2, 2008

(65) Prior Publication Data

US 2009/0141316 A1    Jun. 4, 2009

(30) Foreign Application Priority Data

Dec. 3, 2007  (JP) ................ 2007-311853

(51) Int. Cl.
*H04N 1/04*  (2006.01)
*G02B 26/08*  (2006.01)

(52) U.S. Cl.
USPC ...... 358/475; 358/1.7; 359/204.1; 359/201.4; 347/243; 347/244

(58) Field of Classification Search
None
See application file for complete search history.

(56) References Cited

U.S. PATENT DOCUMENTS

| | | | |
|---|---|---|---|
| 5,557,448 A | 9/1996 | Endo et al. |
| 5,570,224 A | 10/1996 | Endo et al. |
| 5,581,392 A | 12/1996 | Hayashi |
| 5,652,670 A | 7/1997 | Hayashi |
| 5,875,051 A | 2/1999 | Suzuki et al. |
| 6,069,724 A | 5/2000 | Hayashi et al. |
| 6,081,386 A | 6/2000 | Hayashi et al. |
| 6,104,522 A | 8/2000 | Hayashi et al. |
| 6,185,026 B1 | 2/2001 | Hayashi et al. |
| 6,198,562 B1 | 3/2001 | Hayashi et al. |
| 6,369,927 B2 | 4/2002 | Hayashi |
| 6,400,391 B1 | 6/2002 | Suhara et al. |
| 6,462,853 B2 | 10/2002 | Hayashi |
| 6,587,245 B2 | 7/2003 | Hayashi |
| 6,657,765 B2 | 12/2003 | Hayashi et al. |
| 6,757,089 B2 | 6/2004 | Hayashi |
| 6,768,506 B2 | 7/2004 | Hayashi et al. |
| 6,771,296 B2 | 8/2004 | Hayashi et al. |
| 6,771,407 B2 | 8/2004 | Hayashi et al. |
| 6,788,444 B2 | 9/2004 | Suzuki et al. |
| 6,803,941 B2 | 10/2004 | Hayashi et al. |
| 6,903,856 B2 | 6/2005 | Hayashi |
| 6,906,739 B2 | 6/2005 | Suzuki et al. |
| 6,934,061 B2 | 8/2005 | Ono et al. |

(Continued)

FOREIGN PATENT DOCUMENTS

| JP | 51-100742 | 9/1976 |
|---|---|---|
| JP | 4-149524 | 5/1992 |

(Continued)

*Primary Examiner* — David Moore
*Assistant Examiner* — Pawandeep Dhingra
(74) *Attorney, Agent, or Firm* — Dickstein Shapiro LLP

(57) ABSTRACT

A deflector deflects a light beam from a light source. A scanning optical system focuses the light beam deflected by the deflector. An image carrying member is located at a focal position of the light beam and includes a surface that is scanned in a main scanning direction with the light beam focused by the scanning optical system. One pixel of an image is formed by a plurality of light spots having different focal positions in at least a sub-scanning direction. At least one light spot from among the light spots is formed on the surface of the image carrying member at a scan timing different from those of rest of the light spots.

8 Claims, 18 Drawing Sheets

(56) References Cited

U.S. PATENT DOCUMENTS

| | | |
|---|---|---|
| 6,956,685 B2 | 10/2005 | Hayashi |
| 6,987,593 B2 | 1/2006 | Hayashi et al. |
| 7,006,120 B2 | 2/2006 | Sakai et al. |
| 7,050,210 B2 | 5/2006 | Atsuumi et al. |
| 7,068,296 B2 | 6/2006 | Hayashi et al. |
| 7,072,127 B2 | 7/2006 | Suhara et al. |
| 7,088,484 B2 * | 8/2006 | Hayashi et al. ............ 359/204.1 |
| 7,106,483 B2 | 9/2006 | Hayashi et al. |
| 7,145,705 B2 | 12/2006 | Hayashi |
| 7,218,432 B2 * | 5/2007 | Ichii et al. ............... 359/204.4 |
| 7,236,281 B2 | 6/2007 | Hayashi et al. |
| 7,253,937 B2 | 8/2007 | Ueda et al. |
| 7,271,823 B2 | 9/2007 | Izumi et al. |
| 7,271,824 B2 | 9/2007 | Omori et al. |
| 7,417,777 B2 | 8/2008 | Saisho et al. |
| 7,443,558 B2 | 10/2008 | Sakai et al. |
| 2003/0053156 A1 | 3/2003 | Satoh et al. |
| 2003/0067533 A1 * | 4/2003 | Omori et al. ................. 347/248 |
| 2004/0001241 A1 * | 1/2004 | Hayashi et al. ............... 359/216 |
| 2004/0036936 A1 | 2/2004 | Nakajima et al. |
| 2005/0243396 A1 | 11/2005 | Fujii et al. |
| 2006/0232659 A1 | 10/2006 | Hayashi et al. |
| 2006/0245009 A1 | 11/2006 | Akiyama et al. |
| 2006/0284968 A1 | 12/2006 | Hayashi et al. |
| 2006/0285186 A1 * | 12/2006 | Ishida et al. .................. 359/204 |
| 2007/0058255 A1 | 3/2007 | Imai et al. |
| 2007/0114454 A1 * | 5/2007 | Kozakai et al. ............. 250/492.2 |
| 2007/0166077 A1 * | 7/2007 | Inoue et al. ................... 399/227 |
| 2007/0253048 A1 | 11/2007 | Sakai et al. |
| 2007/0297036 A1 | 12/2007 | Nakamura et al. |
| 2008/0024849 A1 | 1/2008 | Hayashi et al. |
| 2008/0025759 A1 * | 1/2008 | Ichii et al. ................... 399/178 |
| 2008/0055690 A1 | 3/2008 | Nakamura et al. |
| 2008/0062491 A1 | 3/2008 | Nakamura et al. |
| 2008/0068689 A1 | 3/2008 | Saisho et al. |
| 2008/0068693 A1 | 3/2008 | Hayashi et al. |
| 2008/0100895 A1 | 5/2008 | Hayashi et al. |
| 2008/0123159 A1 | 5/2008 | Hayashi et al. |
| 2008/0180772 A1 | 7/2008 | Miyatake et al. |
| 2008/0192319 A1 | 8/2008 | Miyatake et al. |
| 2008/0204840 A1 | 8/2008 | Watanabe et al. |
| 2008/0204841 A1 | 8/2008 | Suzuki et al. |
| 2008/0204842 A1 | 8/2008 | Arai et al. |
| 2008/0212999 A1 | 9/2008 | Masuda et al. |
| 2008/0218827 A1 | 9/2008 | Watanabe et al. |
| 2008/0219601 A1 | 9/2008 | Arai et al. |
| 2008/0266633 A1 | 10/2008 | Hirakawa et al. |
| 2008/0267662 A1 | 10/2008 | Arai et al. |
| 2008/0267663 A1 | 10/2008 | Ichii et al. |
| 2008/0285104 A1 | 11/2008 | Arai et al. |

FOREIGN PATENT DOCUMENTS

| | | |
|---|---|---|
| JP | 2004-126192 | 4/2004 |
| JP | 2005-309031 | 11/2005 |
| JP | 2006-301482 | 11/2006 |
| JP | 2007-196589 | 8/2007 |
| JP | 2008-275711 | 11/2008 |

* cited by examiner

FIG. 4

| | DEFLECTOR-SIDE SCANNING LENS | |
|---|---|---|
| | INCIDENT SURFACE | OUTPUT SURFACE |
| $R_m$ | −120 | −59.279 |
| $R_{s0}$ | −500 | −600 |
| $a_{00}$ | 0 | 0 |
| $a_{04}$ | $8.88524 \times 10^{-7}$ | $9.22409 \times 10^{-7}$ |
| $a_{06}$ | $-2.62914 \times 10^{-10}$ | $6.77825 \times 10^{-11}$ |
| $a_{08}$ | $2.18464 \times 10^{-14}$ | $-4.11244 \times 10^{-14}$ |
| $a_{10}$ | $1.36766 \times 10^{-17}$ | $1.3728 \times 10^{-17}$ |
| $a_{12}$ | $-3.13542 \times 10^{-21}$ | $2.06956 \times 10^{-21}$ |
| $b_{01}$ | 0 | $-1.59477 \times 10^{-6}$ |
| $b_{02}$ | 0 | $-4.33213 \times 10^{-6}$ |
| $b_{03}$ | 0 | $4.98199 \times 10^{-9}$ |
| $b_{04}$ | 0 | $-2.85938 \times 10^{-9}$ |
| $b_{05}$ | 0 | $-2.67713 \times 10^{-12}$ |
| $b_{06}$ | 0 | $2.87783 \times 10^{-13}$ |
| $b_{07}$ | 0 | $-1.91653 \times 10^{-15}$ |
| $b_{08}$ | 0 | $2.04238 \times 10^{-15}$ |
| $b_{09}$ | 0 | $1.01413 \times 10^{-18}$ |
| $b_{10}$ | 0 | $-6.7299 \times 10^{-19}$ |

FIG. 5

| | DEFLECTOR-SIDE SCANNING LENS | |
|---|---|---|
| | INCIDENT SURFACE | OUTPUT SURFACE |
| $R_m$ | −10000 | 540.625 |
| $R_{s0}$ | 521.92 | −40.751 |
| $a_{00}$ | 0 | 0 |
| $a_{04}$ | $3.28563 \times 10^{-7}$ | $1.27798 \times 10^{-7}$ |
| $a_{06}$ | $-7.08542 \times 10^{-11}$ | $-4.62873 \times 10^{-11}$ |
| $a_{08}$ | $6.26922 \times 10^{-15}$ | $4.04921 \times 10^{-15}$ |
| $a_{10}$ | $-2.73157 \times 10^{-19}$ | $-1.65975 \times 10^{-19}$ |
| $a_{12}$ | $4.73881 \times 10^{-24}$ | $2.58548 \times 10^{-24}$ |
| $b_{01}$ | $-7.57567 \times 10^{-7}$ | 0 |
| $b_{02}$ | $-1.1328 \times 10^{-6}$ | $2.31146 \times 10^{-7}$ |
| $b_{03}$ | $2.60617 \times 10^{-10}$ | 0 |
| $b_{04}$ | $7.89614 \times 10^{-11}$ | 0 |
| $b_{05}$ | $-5.02709 \times 10^{-14}$ | 0 |
| $b_{06}$ | $1.40512 \times 10^{-14}$ | 0 |
| $b_{07}$ | $4.55389 \times 10^{-18}$ | 0 |
| $b_{08}$ | $-2.01401 \times 10^{-18}$ | 0 |
| $b_{09}$ | $-1.54602 \times 10^{-22}$ | 0 |
| $b_{10}$ | $7.48935 \times 10^{-23}$ | 0 |

| d1 | d2 | d3 | d4 | d5 |
|---|---|---|---|---|
| 46.06 | 3.0 | 70 | 12.85 | 3.0 |

| d6 | d7 | d8 | d9 | d10 | d11 |
|---|---|---|---|---|---|
| 45.15 | 46.31 | 13.50 | 89.73 | 3.50 | 141.36 |

UNIT : mm

| | SCANNING | | | |
|---|---|---|---|---|
| | FIRST SCAN | SECOND SCAN | THIRD SCAN | FOURTH SCAN |
| CASE 1 | ●●●● | | | |

FIG. 22

| CASE 2 | SCANNING | | | |
|---|---|---|---|---|
| | FIRST SCAN | SECOND SCAN | THIRD SCAN | FOURTH SCAN |
| 2-1 | ● ● | ○ ● ○ ● | | |
| 2-2 | ● ● | ○ ○ ● ● | | |
| 2-3 | ● | ● ○ ● ● | | |
| 2-4 | ● ● ● | ○ ○ ● ○ | | |

FIG. 23

| CASE 3 | SCANNING | | | |
|---|---|---|---|---|
| | FIRST SCAN | SECOND SCAN | THIRD SCAN | FOURTH SCAN |
| 3-1 | ● ● | ○ ● ○ | ○ ○ ○ ● | |
| 3-2 | ● | ● ○ ● | ○ ○ ● ○ | |
| 3-3 | ● | ○ ● | ○ ● ○ ● | |
| 3-4 | ● | ○ ● ● | ○ ○ ○ ● | |

FIG. 24
| | SCANNING | | | |
|---|---|---|---|---|
| | FIRST SCAN | SECOND SCAN | THIRD SCAN | FOURTH SCAN |
| CASE 4 | ● | ○<br>● | ○<br>○<br>● | ○<br>○<br>○<br>● |
FIG. 25A
FIRST SCAN
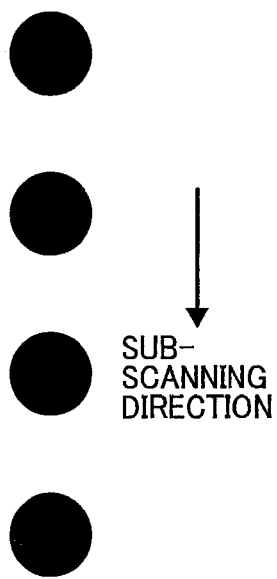
FIG. 25B
SECOND SCAN
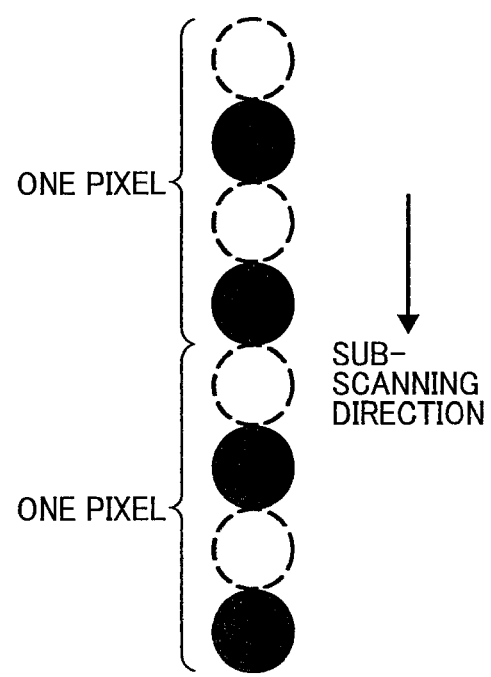

IMAGE FORMING APPARATUS

CROSS-REFERENCE TO RELATED APPLICATIONS

The present application claims priority to and incorporates by reference the entire contents of Japanese priority document 2007-311853 filed in Japan on Dec. 3, 2007.

BACKGROUND OF THE INVENTION

1. Field of the Invention

The present invention relates to an image forming apparatus, and more particularly, to an image forming apparatus that forms an image by scanning a light beam modulated based on an image data.

2. Description of the Related Art

As a response to an increasing demand for high-speed and high-resolution image formation, image forming apparatuses using a multi-beam writing method (for example, Japanese Patent Application Laid-open No. S51-100742) have been proposed in which multiple light beams are simultaneously used for scanning.

However, when one pixel of an image is formed by a plurality of light spots, a phenomenon called 'reciprocatory failure' occurs, leading to unevenness of density in a developed image (output image) and degradation of image quality.

Various measures have been proposed to reduce the unevenness of density in the output image (for example, Japanese Patent Application Laid-open No. H4-149524, Japanese Patent Application Laid-open No. 2006-301482, and Japanese Patent Application Laid-open No. 2007-196589).

However, a demand for higher image quality is anticipated in the future, and to answer the demand, the existing image forming apparatuses may incur high cost.

SUMMARY OF THE INVENTION

It is an object of the present invention to at least partially solve the problems in the conventional technology.

According to one aspect of the present invention, there is provided an image forming apparatus that forms an image with a light beam modulated by image data. The image forming apparatus includes a light source that includes a plurality of light emitting units and outputs a light beam; a deflector that deflects the light beam from the light source; a scanning optical system that focuses the light beam deflected by the deflector; and an image carrying member that is located at a focal position of the light beam and includes a surface that is scanned in a main scanning direction with the light beam focused by the scanning optical system. One pixel of the image is formed by a plurality of light spots having different focal positions in at least a sub-scanning direction. At least one light spot from among the light spots is formed on the surface of the image carrying member at a scan timing different from those of rest of the light spots.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a tabular representation of values concerning a shape of a deflector-side scanning lens shown in FIG. 2;

FIG. 5 is a tabular representation of values concerning a shape of an imaging-surface-side scanning lens shown in FIG. 2;

FIG. 22 is a schematic diagram to explain a case 2 of FIG. 20;

FIG. 23 is a schematic diagram to explain a case 3 of FIG. 20;

FIG. 24 is a schematic diagram to explain a case 4 of FIG. 20;

FIGS. 25A and 25B are schematic diagrams to explain scanning according to the present embodiment;

DETAILED DESCRIPTION OF THE PREFERRED EMBODIMENTS

Figure 1:
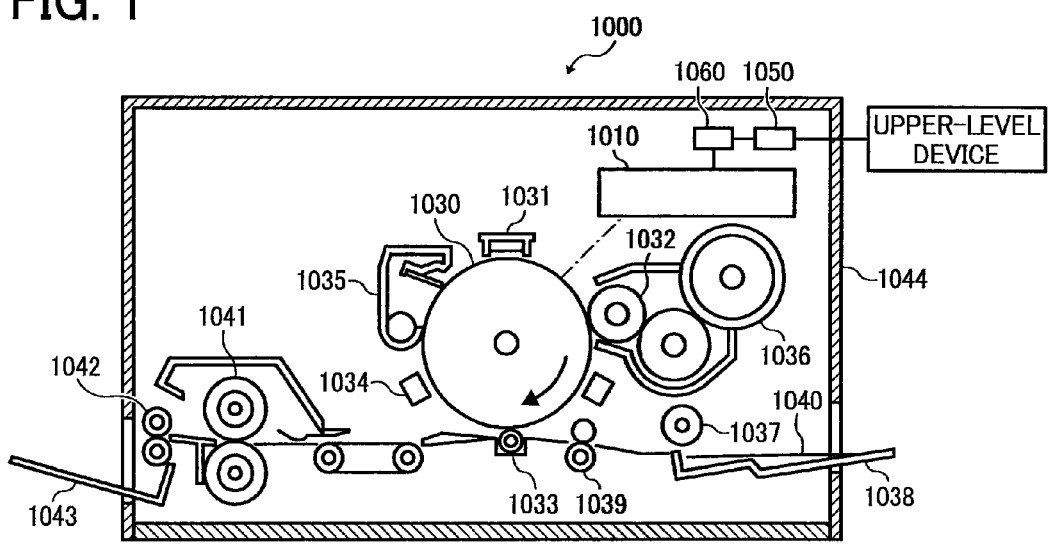
FIG. 1 is a schematic diagram of a laser printer according to a first embodiment of the present invention.

Exemplary embodiments according to the present invention are explained below with reference to FIGS. 1 to 25B. FIG. 1 is a schematic diagram of a laser printer 1000 that serves as an image forming apparatus according to a first embodiment of the present invention.

The laser printer 1000 includes an optical scanning device 1010, a photosensitive drum 1030, an electric charger 1031, a developing roller 1032, a transfer charger 1033, a neutralizing unit 1034, a cleaning unit 1035, a toner cartridge 1036, a paper feeding roller 1037, a paper feeding tray 1038, a pair of registration rollers 1039, a fixing roller 1041, a discharge roller 1042, a communication control device 1050, and a printer control device 1060 that performs overall control of all the parts mentioned above. All the parts mentioned above are arranged at designated positions within a printer body 1044.

The communication control device 1050 performs control of mutual communication between the laser printer 1000 and an upper-level device (such as a personal computer) over a network.

The photosensitive drum 1030 is a cylindrical member with a photosensitive layer covering its surface. In other words, the surface of the photosensitive drum 1030 serves as a scanning surface. The photosensitive drum 1030 is devised to rotate in the direction of the arrow shown in FIG. 1.

In the vicinity of the surface of the photosensitive drum 1030, the electric charger 1031, the developing roller 1032, the transfer charger 1033, and the neutralizing unit 1034, and the cleaning unit 1035 are arranged in the order in which they are mentioned in the rotation direction of the photosensitive drum 1030.

The electric charger 1031 uniformly charges the surface of the photosensitive drum 1030.

The optical scanning device 1010 exposes the uniformly charged surface of the photosensitive drum 1030 with a light beam modulated based on the image data from the upper-level device, forming a latent image corresponding to the image data on the surface of the photosensitive drum 1030. As the photosensitive drum 1030 rotates, the latent image moves towards the developing roller 1032. The structure of the optical scanning device 1010 is explained in detail later.

The toner cartridge 1036 contains a toner. The toner in the toner cartridge 1036 is supplied to the developing roller 1032.

The developing roller 1032 causes the toner from the toner cartridge 1036 to adhere to the latent image on the surface of the photosensitive drum 1030, converting the latent image into a visible image. As the photosensitive drum 1030 rotates, visible image (hereinafter, "toner image") moves towards the transfer charger 1033.

The paper feeding tray 1038 has stacked therein sheets of recording paper 1040. The paper feeding roller 1037 disposed in the vicinity of the paper feeding tray 1038 picks up one sheet of the recording paper 1040 at a time and conveys it to the registration rollers 1039 from the paper feeding tray 1038. The registration rollers 1039 hold the recording paper 1040 before conveying it towards the gap between the photosensitive drum 1030 and the transfer charger 1033 as the photosensitive drum 1030 rotates.

To electrically attract the toner from the surface of the photosensitive drum 1030 to the recording paper 1040, the transfer charger 1033 is charged with a voltage of a polarity that is opposite to that of the toner. Thus, the voltage on the transfer charger 1033 causes a toner image transfer from the surface of the photosensitive drum 1030 to the recording paper 1040. The recording paper 1040, with the toner image transferred thereon, is conveyed to the fixing roller 1041.

The fixing roller 1041 applies heat and pressure to the recording paper 1040 to fix the toner to the recording paper 1040. The discharge roller 1042 conveys the recording paper 1040 bearing thereon a fixed toner image to a paper discharge tray 1043, where sheets of the recording paper 1040 are stacked one by one.

The neutralizing unit 1034 neutralizes the surface of the photosensitive drum 1030.

The cleaning unit 1035 removes residual toner left behind on the surface of the photosensitive drum 1030. The photosensitive drum 1030 with its surface cleaned is once again ready to be charged by the electric charger 1031.

The structure of the optical scanning device 1010 is explained below.

Figure 2:
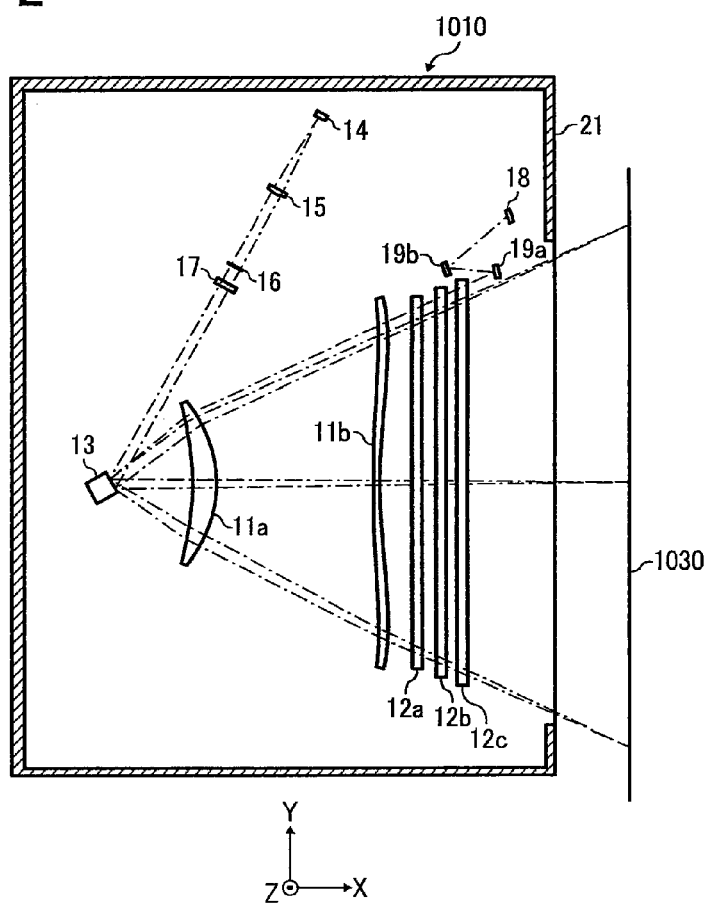
FIG. 2 is a schematic diagram of an optical scanning device shown in FIG. 1.

FIG. 2 is a schematic diagram of the optical scanning device 1010 shown in FIG. 1. The optical scanning device 1010 includes a deflector-side scanning lens 11*a*, an imaging-surface-side scanning lens 11*b*, three scanning mirrors 12*a* to 12*c*, a polygon mirror 13, a light source 14, a coupling lens 15, an apertured plate 16, a cylindrical lens 17, a synchronization detection sensor 18, two synchronization detection mirrors 19*a* and 19*b*, and a scan control device 22 (not shown in FIG. 2, but shown in FIG. 14). The parts mentioned above are arranged at designated positions in a housing 21. In this detailed description, a three-dimensional Cartesian coordinate system is used with the direction along the long axis of the photosensitive drum 1030 representing the Y-axis, and the direction along the optical axes of the deflector-side scanning lens 11*a* and the imaging-surface-side scanning lens 11*b* representing the X-axis.

Figure 3A:
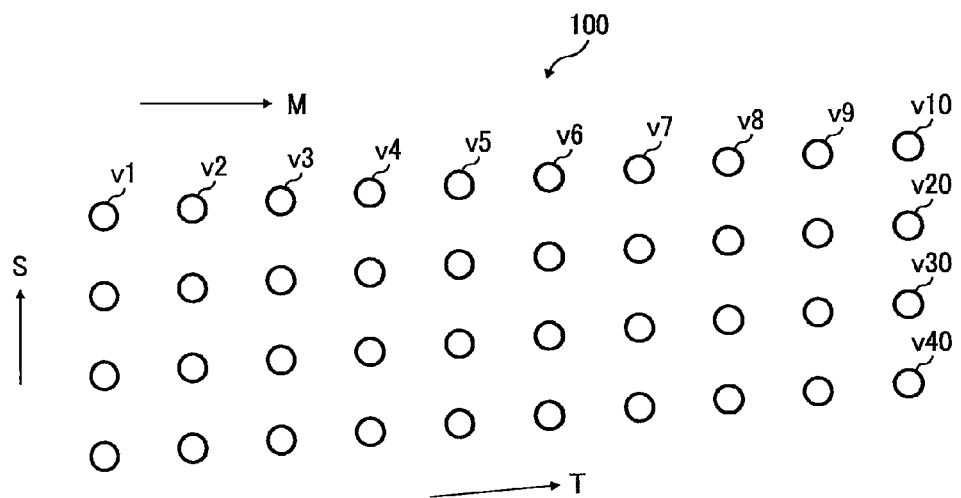
FIGS. 3A and 3B are schematic diagrams to explain a vertical cavity surface-emitting laser (VCSEL) two-dimensional array of a light source shown in FIG. 2.

FIG. 3A is a drawing of one example of the light source 14, in which 40 light emitting units are arranged on a board as a two-dimensional array 100.

In FIG. 3A, the reference symbol M indicates a main scanning direction, and the reference symbol S indicates a sub-scanning direction (which is the same as the direction of the Z-axis). The reference symbol T indicates an inclination angle $\alpha$ ($0° < \alpha < 90°$) from T to S.

The two-dimensional array 100 includes four rows of ten light emitting units arranged at regular intervals along T. The light emitting units along S are also arranged at regular intervals, so that when the 40 light emitting units are orthographically projected on an imaginary line extending along S, they are at regular intervals. The rows of light emitting units are denoted, from top to bottom on the page surface in FIG. 3A, as first light-emitting-unit row, second light-emitting-unit row, third light-emitting-unit row, and fourth light-emitting-unit row, respectively. In this detailed description, the term 'light-emitting-unit interval' refers to the distance between the centers of two adjoining light emitting units.

Each of the light emitting units is assigned a reference symbol. The reference symbols of the light emitting units of the first light-emitting-unit row from left to right on the page surface in FIG. 3A are v1 to v10, respectively. Similarly, the light emitting units in the second, third, and fourth light-emitting-unit rows, are assigned, from left to right, the reference symbols v11 to v20, v21 to v30, and v31 to v40, respectively.

Each light emitting unit is a vertical cavity surface-emitting laser (VCSEL) having an oscillation wavelength of 780 nanometers (nm). In other words, the two-dimensional array 100 is a surface-emitting laser array. The angle of divergence of the light beam emitted by each light source 14 along and M and S is of the order of 7°±1. The near field pattern of each light emitting unit is circular with a diameter of 4 micrometers (μm).

Figure 3B:
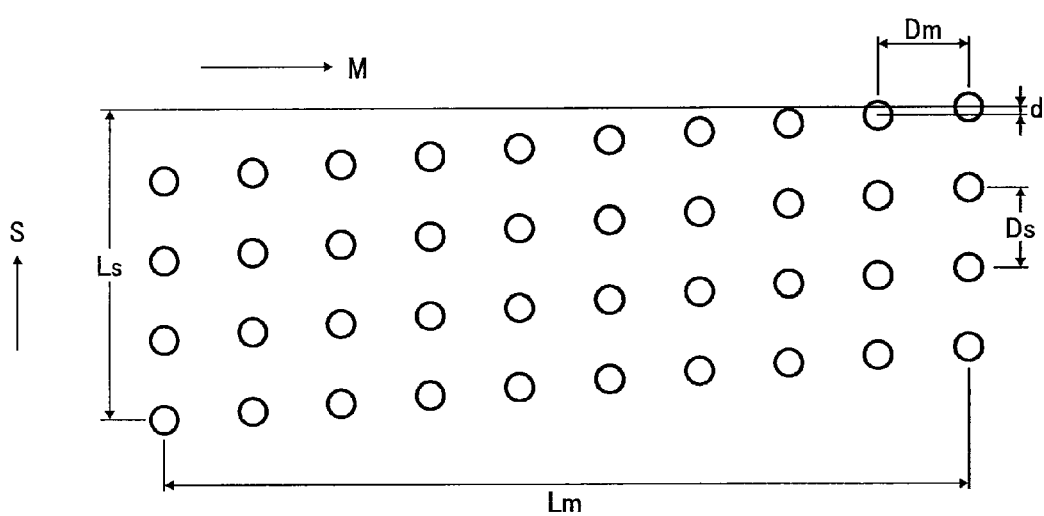

An example is shown in FIG. 3B wherein d=5.0 μm, Dm=30 μm, Ds=25 micrometers, Lm=Dm×9=270 μm, Ls=d×39=195 μm, where d is an interval between two adjoining light emitting units when all the light emitting units are orthographically projected-on an imaginary line extending along S, Dm is an interval between the concerned light emitting units along M, Ds is an interval between the rows of the concerned light emitting units along S, Lm is an interval between the concerned light emitting units along M, and Ls is an interval between the concerned light emitting units along S.

Returning to FIG. 2, the coupling lens 15 converges the light emitted from the light source 14 into a substantially parallel light. The coupling lens 15 has a focal length of 47.7 millimeters (mm).

The apertured plate 16 regulates the beam diameter of the light beam emerging from the coupling lens 15, and for example, can have a rectangular or elliptical aperture measuring 5.44 mm along the main scanning direction and 2.1 mm along the sub-scanning direction (that is, along Z-axis).

The cylindrical lens 17 focuses the light beam emerging from the aperture of the apertured plate 16 near a reflective surface of the polygon mirror 13 in the sub-scanning direction (along Z-axis). The cylindrical lens 17 has a focal length of 107.0 mm.

The optical system disposed between the light source 14 and the polygon mirror 13 is also called a pre-deflector optical system. The pre-deflector optical system in the present embodiment includes the coupling lens 15, the apertured plate 16, and the cylindrical lens 17.

The polygon mirror 13, for example, can be a tetrahedral member of an inscribed radius of 7 mm in which each of the four faces is a mirror. The polygon mirror 13 rotates at a constant speed about an axis that is parallel to the sub-scanning direction (along Z-axis) and reflects the light beam emerging from the cylindrical lens 17. The light beam has an angle of incidence of 70 degrees at which it hits the polygon mirror 13, and a field angle due to rotation of the reflective surface of 72 degrees.

The deflector-side scanning lens 11a is disposed on an optical path of the light beam deflected by the polygon mirror 13.

The imaging-surface-side scanning lens 11b is disposed on an optical path of the light beam after the beam emergences from the deflector-side scanning lens 11a. The light beam emerging from the imaging-surface-side scanning lens 11b passes through the three scanning mirrors 12a to 12c before forming a light spot on the surface of the photosensitive drum 1030. As the polygon mirror 13 rotates, the light spot travels along the long axis of the photosensitive drum 1030. In other words, the light spot scans the surface of the photosensitive drum 1030. The scanning of the surface of the photosensitive drum 1030 takes place in the main scanning direction.

A light incident surface and a light emission surface of the deflector-side scanning lens 11a and the imaging-surface-side scanning lens 11b are non-spherical surfaces represented by Equations (1) and (2) given below. In Equations (1) and (2), X is the coordinate along the X-axis and Y is the coordinate along the Y-axis. The center of the light incident surface Y is taken as zero. $C_{m0}$, which is a multiplicative inverse of a curvature radius $R_m$, is the curvature at Y=0 along the main scanning direction. $a_{00}$, $a_{01}$, $a_{02}$, etc., are non-spherical surface coefficients of a main scanning shape. Cs(Y) is a curvature of Y along the sub-scanning direction. $R_{s0}$ is a curvature radius on the optical axis in the sub-scanning direction. $b_{00}$, $b_{01}$, $b_{02}$, etc., are non-spherical surface coefficients in the sub-scanning direction. The optical axis is the axis that passes through the center along the sub-scanning direction at Y=0.

$$X(Y) = \frac{C_{m0} \cdot Y^2}{1 + \sqrt{1 - (1 + a_{00}) \cdot C_{m0}^2 \cdot Y^2}} + \qquad (1)$$
$$a_{01} \cdot Y + a_{02} \cdot Y^2 + a_{03} \cdot Y^3 + a_{04} \cdot Y^4 + \ldots$$

$$Cs(Y) = \frac{1}{R_{S0}} + b_{01} \cdot Y + b_{02} \cdot Y^2 + b_{03} \cdot Y^3 + \ldots \qquad (2)$$

FIGS. 4 and 5 are tabular representations of the values of $R_m$, $R_{s0}$, and non-spherical surface coefficients of the light incident surface and the light emission surface of the deflector-side scanning lens 11a and the imaging-surface-side scanning lens 11b, respectively.

Figure 6:
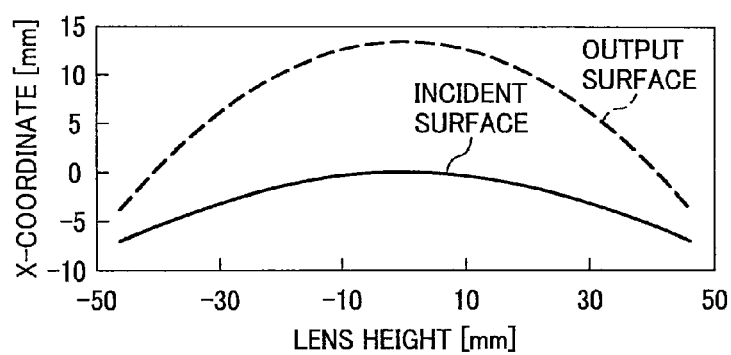
FIG. 6 is a schematic diagram to explain the shape of the deflector-side scanning lens shown in FIG. 2.
Figure 7:
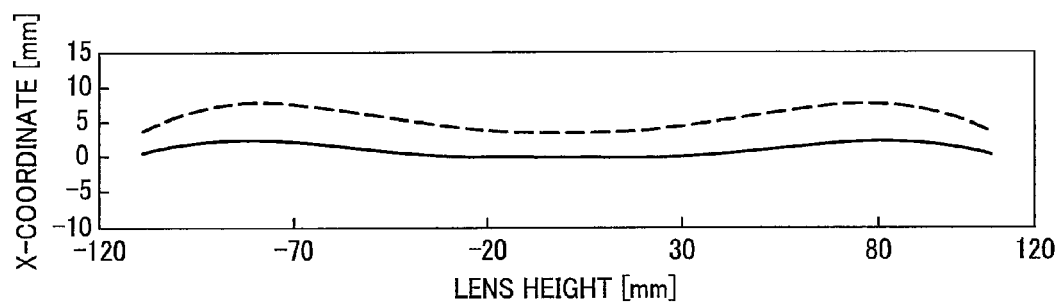
FIG. 7 is a schematic diagram to explain the shape of the imaging-surface-side scanning lens shown in FIG. 2.

FIG. 6 is a schematic diagram to explain the shape of the deflector-side scanning lens 11a obtained by substituting the values of the table in FIG. 4 in Equation (1). FIG. 7 is a schematic diagram to explain the shape of the imaging-surface-side scanning lens 11b obtained by substituting the values of the table in FIG. 5 in Equation (1).

Figure 8:
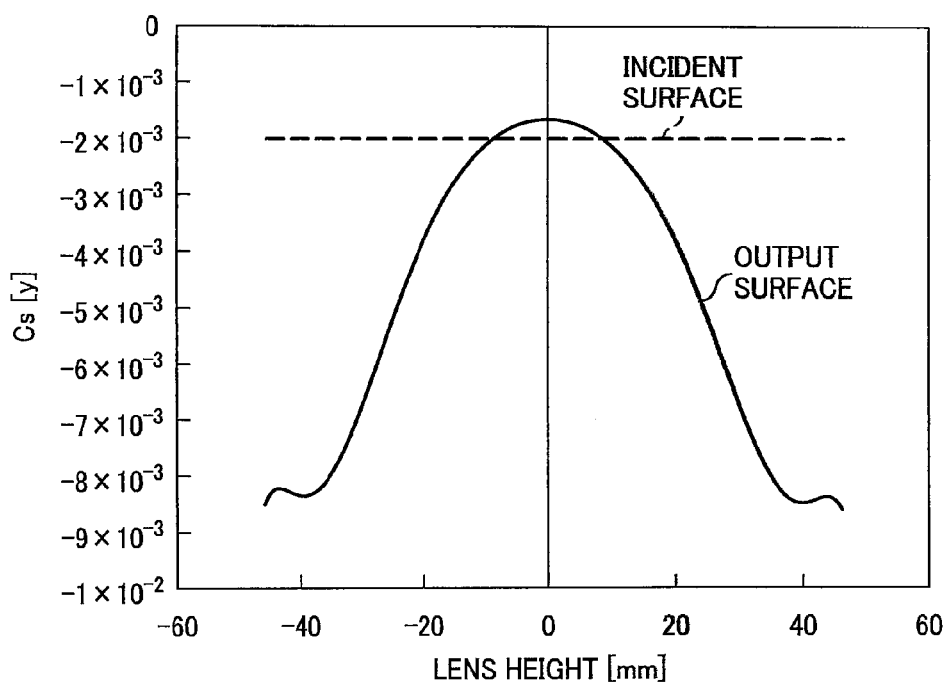
FIG. 8 is a graphical representation to explain a curvature of the deflector-side scanning lens shown in FIG. 2 in a sub-scanning direction.
Figure 9:
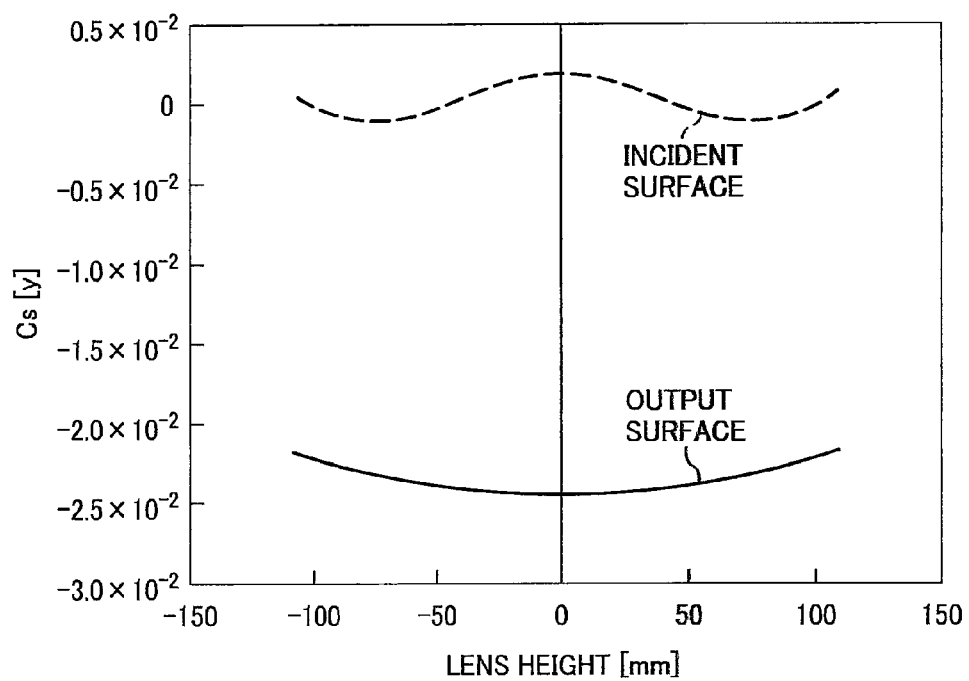
FIG. 9 is a graphical representation to explain a curvature of the imaging-surface-side scanning lens shown in FIG. 2 in the sub-scanning direction.

FIG. 8 is a graphical representation of Cs(Y) of the light incident surface and the light emission surface of the deflector-side scanning lens 11a obtained by substituting the values of the table in FIG. 4 in Equation (2). FIG. 9 is a graphical representation of Cs(Y) of the light incident surface and the light emission surface of the imaging-surface-side scanning lens 11b obtained by substituting the values of the table in FIG. 5 in Equation (2).

The optical system disposed between the polygon mirror 13 and the photosensitive drum 1030 is also called scanning optical system. In the present embodiment, the scanning optical system includes the deflector-side scanning lens 11a, the imaging-surface-side scanning lens 11b, and the three scanning mirrors 12a to 12c.

A lateral magnification of the scanning optical system is −0.97 in the sub-scanning direction, and the lateral magnification of the whole optical system is 2.18. The focal length of the scanning optical system is 237.8 mm in the main scanning direction and 71.4 mm in the sub-scanning direction.

A write width (length of effective scanning area in the main scanning direction) is 323 mm. The diameter of the light spot on the surface of the photosensitive drum 1030 is 52 μm in the main scanning direction and 55 μm in the sub-scanning direction.

Figures 10, 11:
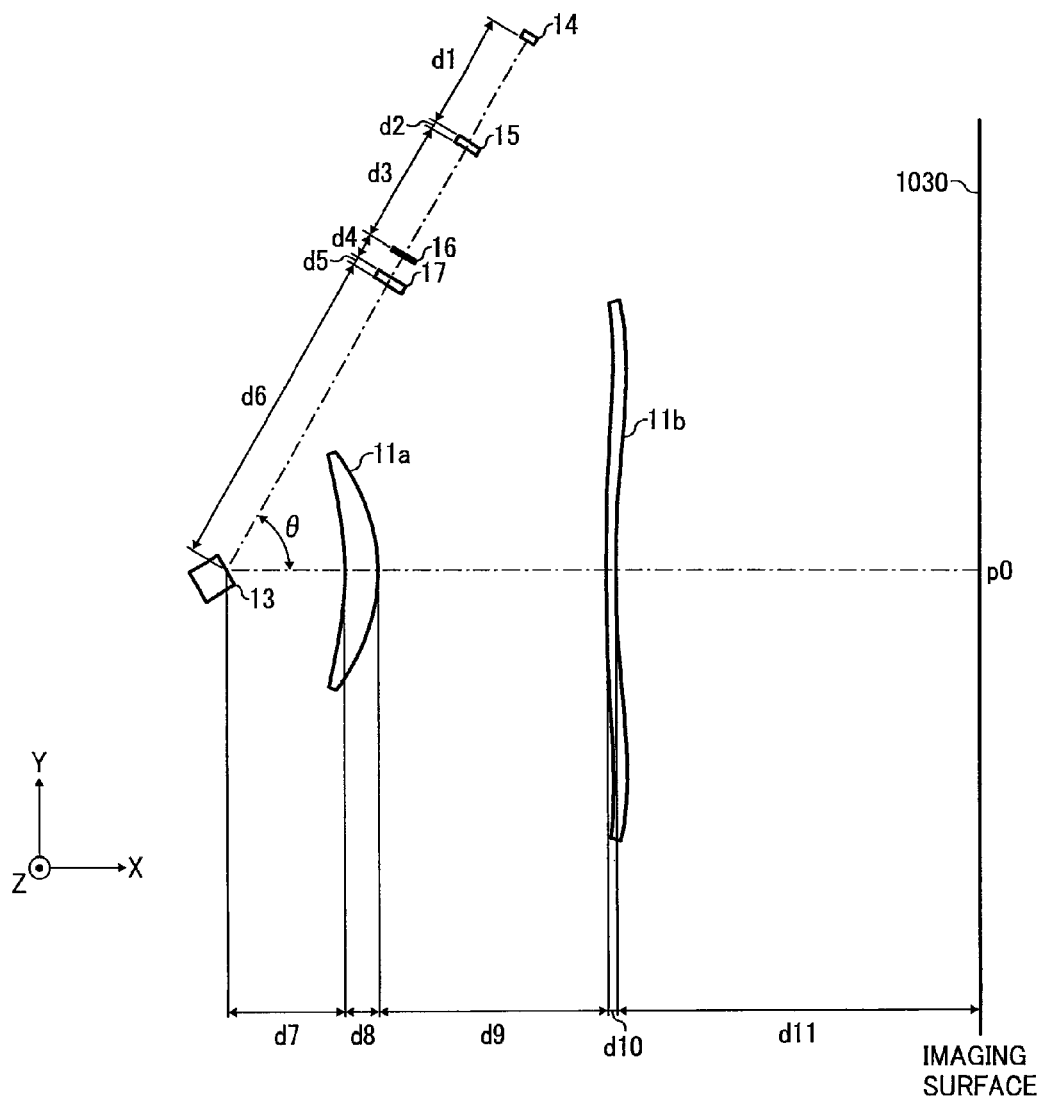
FIG. 10 is a schematic diagram to explain a positional relation between key optical elements of the optical scanning device shown in FIG. 2.
FIG. 11 is another schematic diagram to explain the positional relation between the key optical elements of the optical scanning device shown in FIG. 2.

FIG. 10 is a schematic diagram to explain a positional relation between the pre-deflector optical system and the scanning optical system. FIG. 11 is a tabular representation of the values (in mm) of the reference symbols d1 to d11 shown in FIG. 10.

An emission direction of the light beam from the cylindrical lens 17 and a propagation direction of the light beam reflected by the reflective surface of the polygon mirror 13 towards a position on the photosensitive drum 1030 that corresponds to an image height of zero (indicated by the reference symbol p0 in FIG. 10) form an angle of 60° (indicated by θ in FIG. 10).

Returning to FIG. 2, a part of the light beam emerging from the scanning optical system after being reflected by the polygon mirror 13 that does not play any role in image formation enters the synchronization detection sensor 18 as synchronization detection light beam after passing through the synchronization detection mirrors 19a and 19b.

Figure 12:
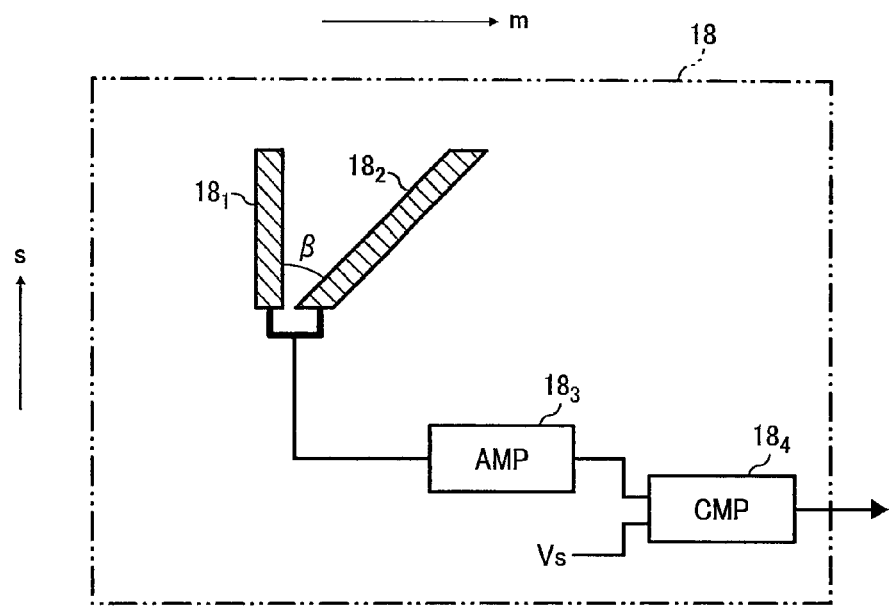
FIG. 12 is a schematic diagram of a synchronization detection sensor of the optical scanning device shown in FIG. 2.

FIG. 12 is a schematic diagram of the synchronization detection sensor 18. The synchronization detection sensor 18 includes a photodetecting element, which in turn includes a first photodetector $18_1$ and a second photodetector $18_2$, an amplifier (AMP) $18_3$ that amplifies a signal (photoelectric conversion signal) according to the amount of light received by the photodetecting element, and a comparator (CMP) $18_4$ that compares a level of an output signal from the amplifier $18_3$ and a preset standard level Vs and outputs an outcome of the comparison in the form of an output signal. The output signal from the comparator $18_4$ is fed to the scan control device 22.

In FIG. 12, the reference symbol m corresponds to the main scanning direction and the reference symbol s indicates the sub-scanning direction (which is the same as the direction of the Z-axis).

The first photodetector $18_1$ is, for example, a rectangular photodetector and is arranged with its long side perpendicular to the direction m. In other words, the two sides through which the synchronization detection light beam passes are perpendicular to the direction m.

The second photodetector $18_2$ is, for example, a parallelogram-shaped photodetector and is arranged on the +m side of the first photodetector $18_1$ with its long side tilted at an angle of β (0<β<90°) relative to the long side of the first photodetector $18_1$ in the region of the photodetecting surface. In other words, the two sides through which the synchronization detection light beam passes are tilted relative to the direction m.

The amplifier $18_3$ reverses as well as amplifies the input signal. Thus, the greater the amount of light received by the photodetecting element, the lower the output signal level of the amplifier $18_3$.

The standard level Vs is set slightly higher than the output signal level (lowest value) of the amplifier $18_3$ at the time when the synchronization detection light beam is received by the photodetecting element. Thus, when light is received by either the first photodetector $18_1$ or the second photodetector $18_2$, the outcome of comparison of the comparator $18_4$ changes and hence output signal of the comparator $18_4$ changes.

Figure 13A:
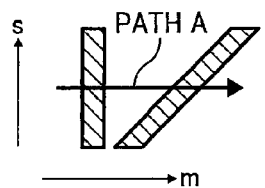
FIGS. 13A to 13D are schematic diagrams to explain the functioning of the synchronization detection sensor shown in FIG. 12.

To enable the light beam to fall on a designed incident position on the surface of the photosensitive drum 1030, the first photodetector $18_1$ and the second photodetector $18_2$ are positioned such that the synchronization detection light beam passes through their substantial centers (see FIG. 13A). The interval between the time the synchronization detection light beam is detected by the first photodetector $18_1$ and the time it is detected by the second photodetector $18_2$ is preset as a standard time interval Ts (see FIG. 13B). For the sake of convenience, the path of the synchronization detection light beam in the synchronization detection sensor 18 corresponding to the incident position will be called path A. In other words, a designed travel path will be called path A.

However, due to variations in temperature and humidity, the designed path of the light beam traveling towards the photosensitive drum 1030 shifts towards the sub-scanning direction (along Z-axis) relative to the factory-set path. As a result, the path of the synchronization detection light beam also shifts towards the sub-scanning direction (that is, towards s) relative to the designed path. Therefore, as shown in FIG. 13C, the travel path of the synchronization detection light beam in the synchronization detection sensor 18 corresponding to the incident position shifts towards the sub-scanning direction relative to the path A. For the sake of convenience, the new travel path will be called path B.

A shift amount Δh of the travel path (see FIG. 13C) can be represented by Equation (3) given below. In Equation (3), ΔT is a difference between a time interval T between a falling edge in the output signal from the comparator $18_4$ and the next falling edge, and the standard time Ts (see FIG. 13D) and V is a travel speed (scanning speed) of the synchronization detection light beam. The shift amount Δh is correlated to the shift amount of the designed path of the light beam traveling towards the photosensitive drum 1030 in the sub-scanning direction (that is, along the Z-axis).

$$\Delta h = (V/\tan\theta) \times \Delta T \qquad (3)$$

Figure 13B:
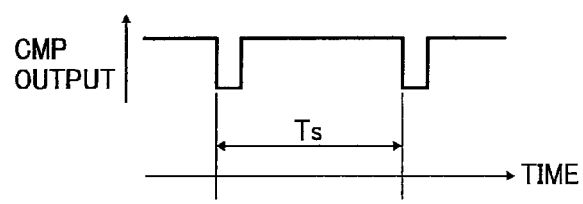
Figure 13C:
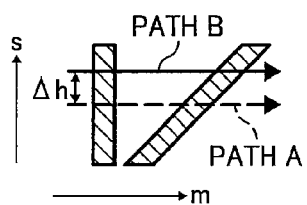
Figure 13D:
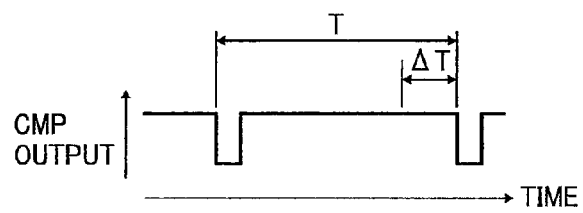

The timing of the falling edge in the output signal of the comparator $18_4$ at the time the synchronization detection light beam is received by the first photodetector $18_1$ does not affect the incident position of the synchronization detection light beam in s direction (see FIGS. 13B and 13D). Therefore, a scan start timing can be determined from the timing of the falling edge of the output signal of the comparator $18_4$ at the time the synchronization detection light beam is received by the first photodetector $18_1$.

Figure 14:
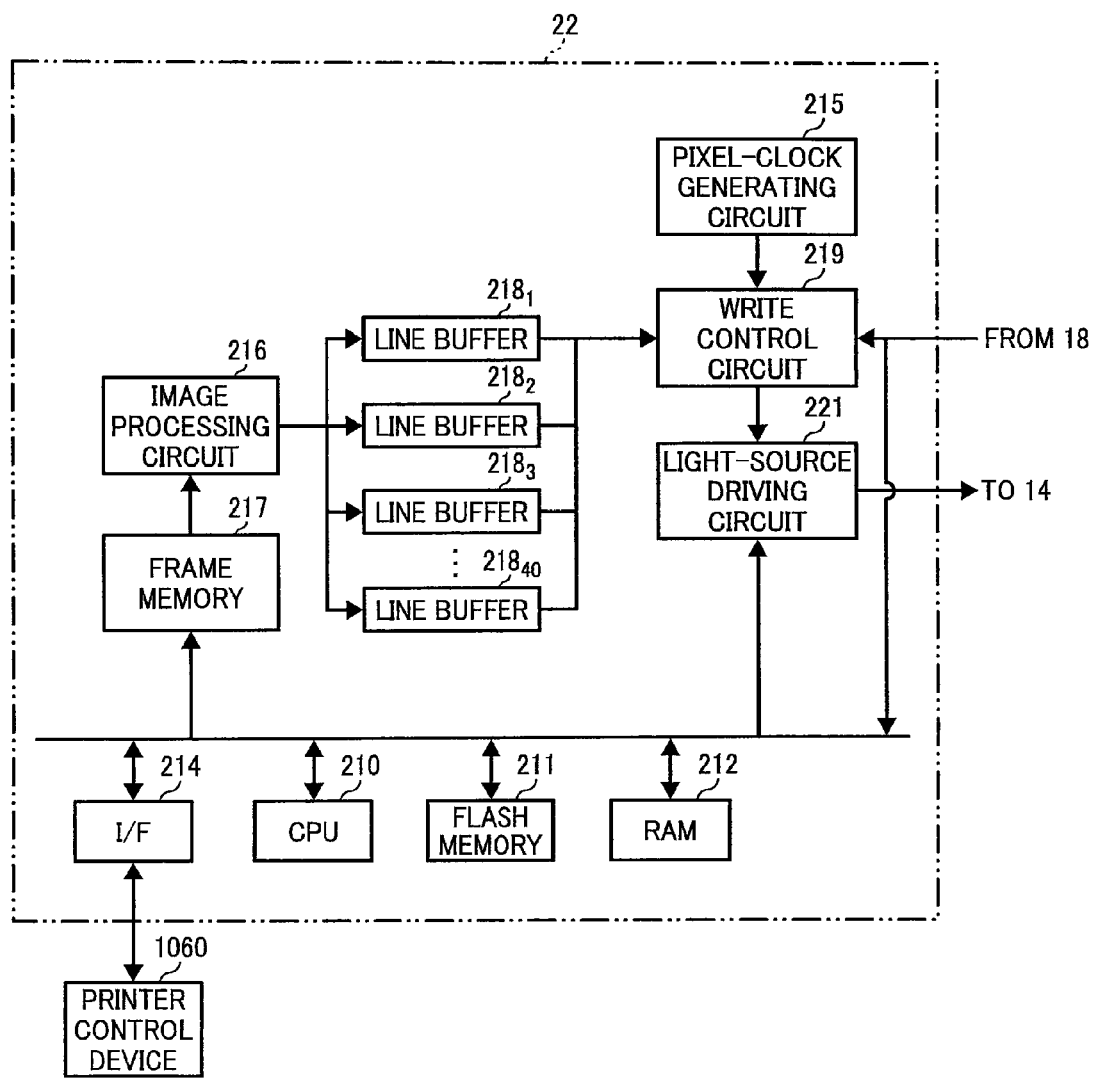
FIG. 14 is a block diagram of a scan control device.

FIG. 14 is a block diagram of the scan control device 22. The scan control device 22 includes a central processing unit (CPU) 210, a flash memory 211, a random access memory (RAM) 212, an interface (I/F) 214, a pixel-clock generating circuit 215, an image processing circuit 216, a frame memory 217, line buffers $218_1$ to $218_{40}$, a write control circuit 219, and a light-source driving circuit 221. The arrows in FIG. 14 represent the direction of flow of signals and data and do not entirely represent the connection relation of the blocks.

The I/F 214 functions as a communication interface that controls mutual communication between the optical scanning device 1010 and the printer control device 1060. Image data from the upper-level device is fed to the optical scanning device 1010 through the I/F 214.

The pixel-clock generating circuit 215 generates pixel clock signals. The frame memory 217 is used by the CPU 210 for temporarily storing raster-expanded image data (hereinafter, "raster data").

The image processing circuit 216 reads the raster data stored in the frame memory 217, creates dot data for each light emitting unit after performing a predetermined halftone process, and outputs the dot data to the line buffer $218_1$ to $218_{40}$ of the respective light emitting unit.

The write control circuit 219 monitors the falling edge in the output signal from the comparator $18_4$ at the time the synchronization detection light beam is received by the first photodetector $18_1$, based on the output signal of the synchronization detection sensor 18. Upon detection of the falling edge, the write control circuit 219 determines the write start timing. At the determined scan start timing, the write control circuit 219 reads the dot data from each of the line buffers $218_1$ to $218_{40}$ of the light emitting units, superposes the dot data on the pixel clock signal from the pixel-clock generating circuit 215, and creates separate modulation data for each light emitting unit.

The light-source driving circuit 221 drives each light emitting unit of the two-dimensional array 100 according to the modulation data created by the write control circuit 219.

The flash memory 211 contains therein various programs written in a code readable by the CPU 210 as well as various kinds of data. The RAM 212 is a working memory. The CPU 210 works according to the programs stored in the flash memory 211 and controls the optical scanning device 1010.

For example, the CPU 210 determines the shift amount Δh for each predetermined timing based on the output signal of the synchronization detection sensor 18 and stores it in the RAM 212.

Figure 15A:
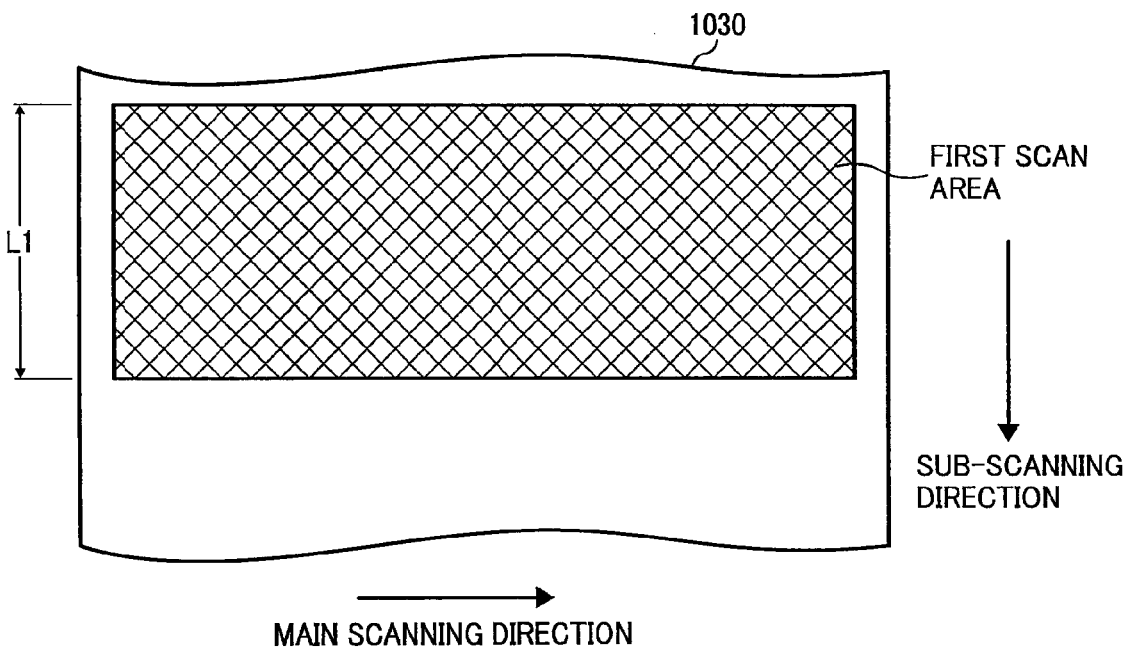
FIGS. 15A and 15B are schematic diagrams to explain primary jump scanning.
Figure 15B:
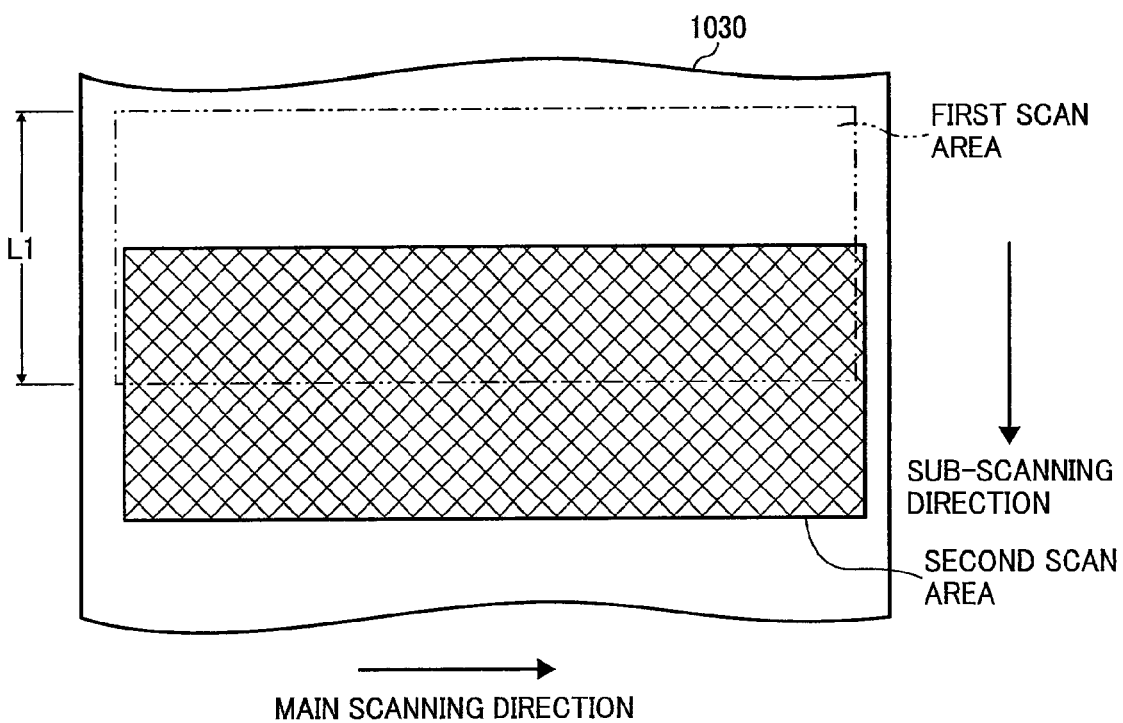
Figure 16:
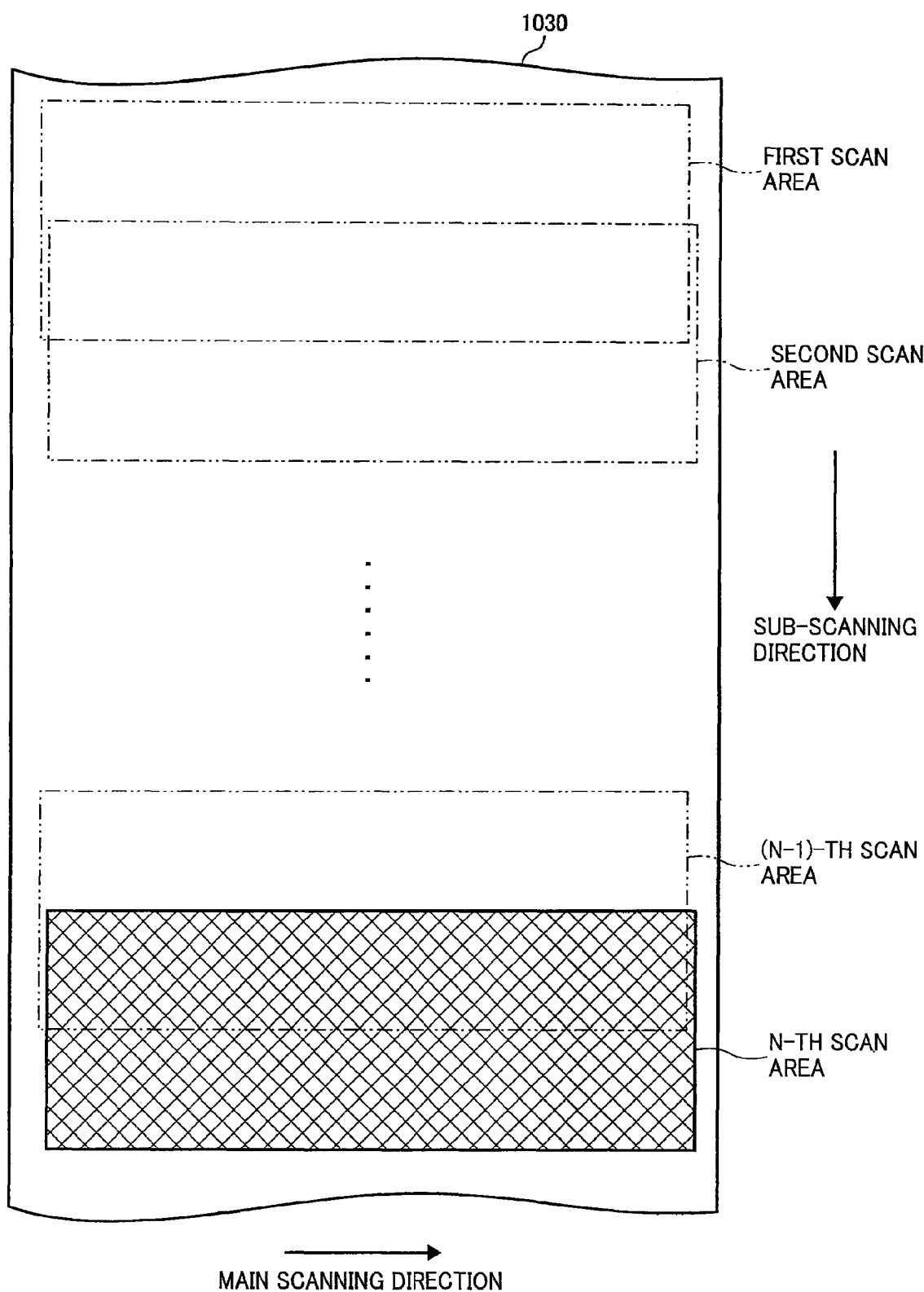
FIG. 16 is another schematic diagram to explain primary jump scanning.

In the present embodiment, as shown in FIGS. 15A and 15B, when a first scan is completed, a second scan is performed after the photosensitive drum 1030 is rotated in such a way that the scan area shifts by a distance L1/2 in the sub-scanning direction (L1 being a distance between two end scan lines of a single scan). In other words, in the present embodiment a so-called primary jump scanning is adopted. As shown in FIG. 16, the latent image is formed on the surface of the photosensitive drum 1030 by repeating primary jump scanning. In FIG. 15B as well as in FIGS. 16 and 26, for the sake of clarity, the first scan area and the second scan area are shown to be slightly shifted in relation to each other in the main scanning direction. However, in actuality, all the scan areas are in perfect alignment in the main scanning direction.

Figure 17:
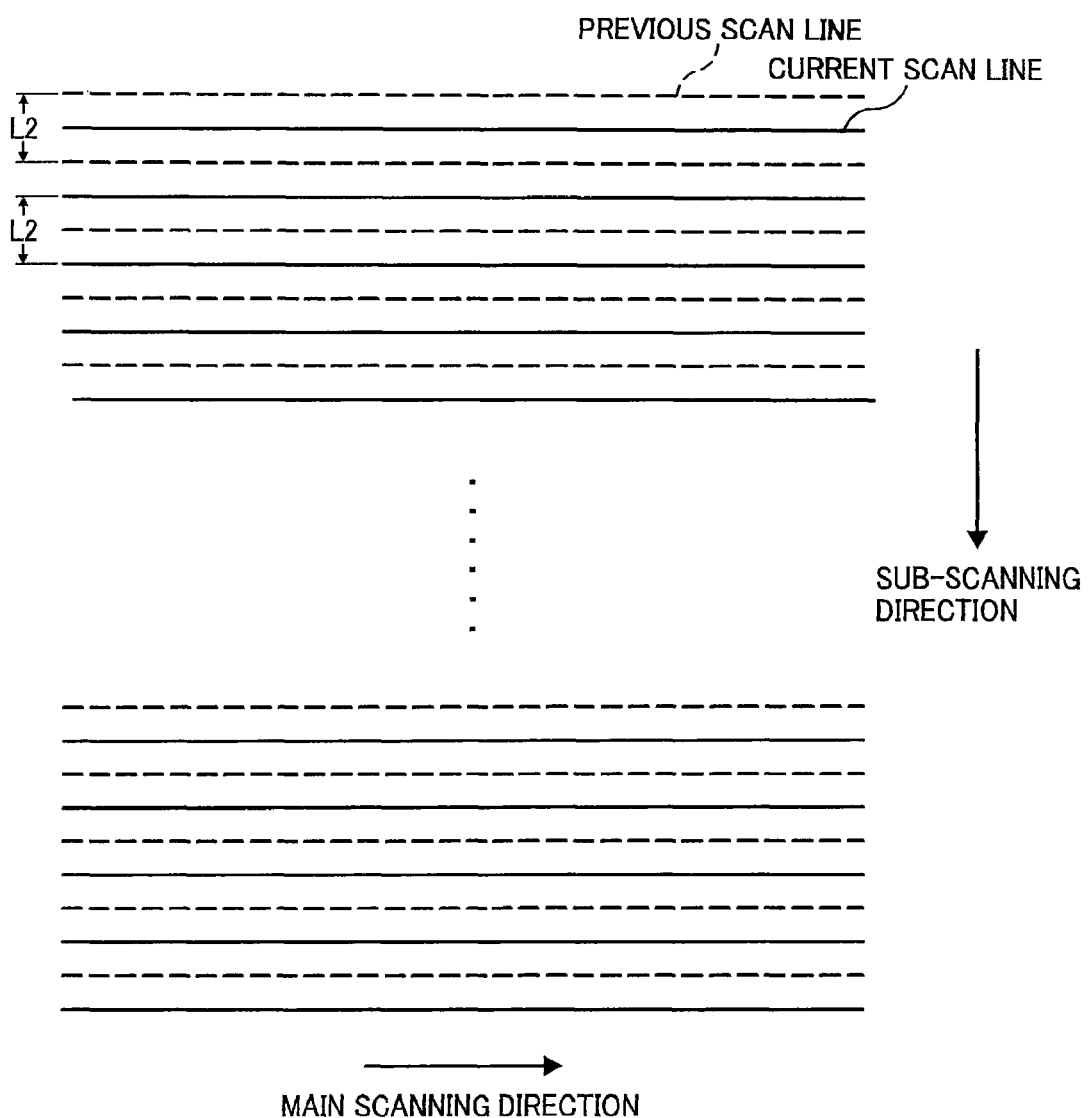
FIG. 17 is yet another schematic diagram to explain primary jump scanning.
Figure 18:
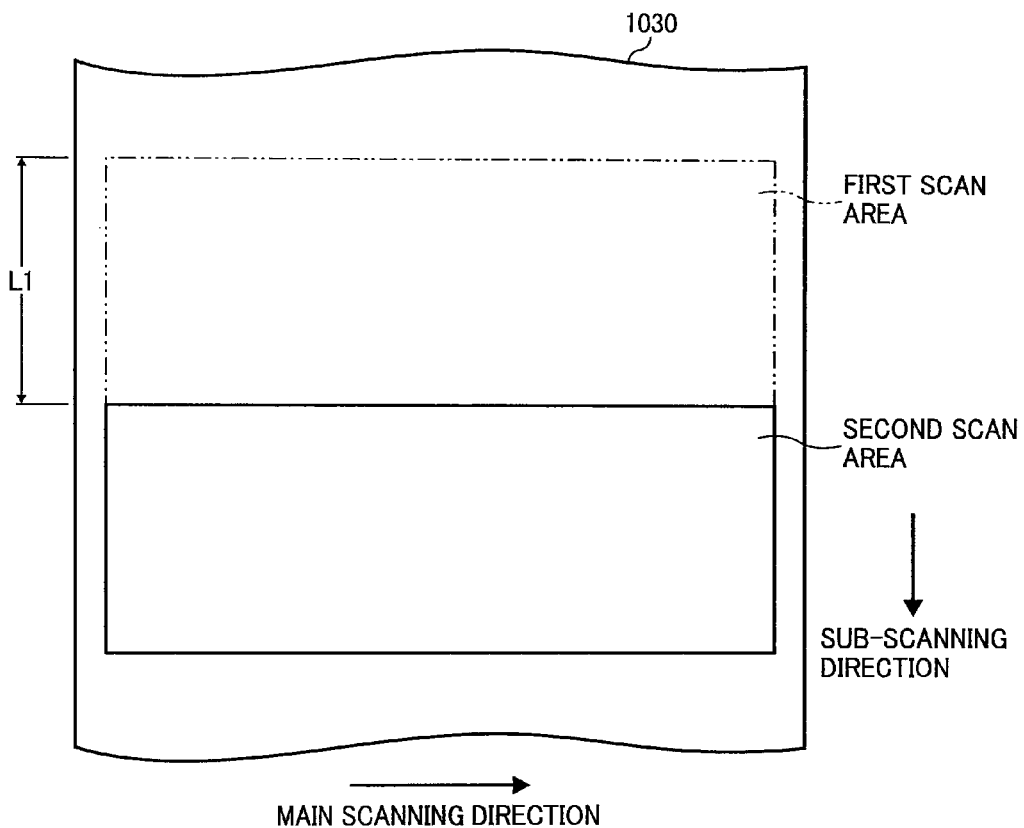
FIG. 18 is a schematic diagram to explain adjacent scanning.

As shown in FIG. 17, in the portion where the first scan area and the second scan area overlap, the scan lines of the two scan areas do not coincide, and each scan line of one scan area lies interposed between two scan lines of the other scan area.

Thus, even if d=5.0 μm in the two-dimensional array 100 and the distance L2 between two adjoining scan lines on the surface of the photosensitive drum 1030 during a single scan is 10.2 μm, the distance between the two adjoining scan lines in the portion where scan areas overlap is halved to 5.2 μm. Thus, the write density can be actually doubled (to 4800 dots per inch (dpi) in this case). In other words, as compared to a so-called adjacent scanning used conventionally (see FIG. 18), for the same write density the value of d can be doubled. Therefore, heat interference among the light emitting units can be reduced, light emission characteristic of the light emitting units can be stabilized and the life of the light source can be increased. Enhanced image quality can be realized as a result of stabilized light emission characteristics.

Thus, the light-emitting-unit interval can be increased without compromising light utilization efficiency if an inequality (k−1)×L2<L1 (where k is the number of light emitting units) can be satisfied. However, if the light-emitting-unit interval is increased too much, a portion of the light beam will deviate significantly from the optical axis and the optical characteristics of the entire light beam will not have the preferred optical characteristics. However, by modifying the inequality to L1<(2k−a)×L2, the entire light beam can be made to have the preferred optical characteristics in addition to increasing the light of the light source.

Figure 19:
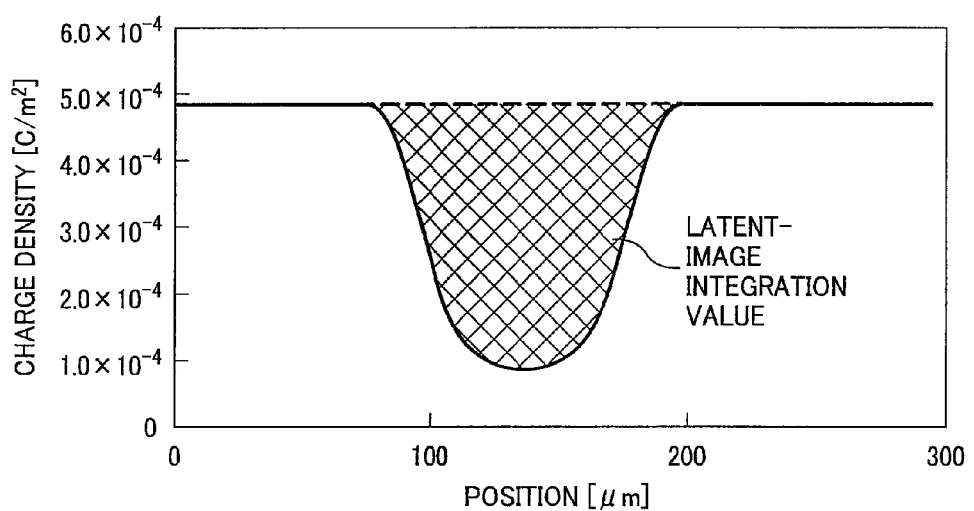
FIG. 19 is a schematic diagram to explain latent-image integration value.

When the light beam exposes the charged photosensitive drum 1030, a charge density of the exposed part falls, as shown in FIG. 19. The area of the portion where the charge density falls is also called latent-image integration value. The larger the latent-image integration value, the greater an adhesion amount of the toner. If there are variations in the latent-image integration values in the latent image, the output image will have density unevenness.

Figures 20, 21:
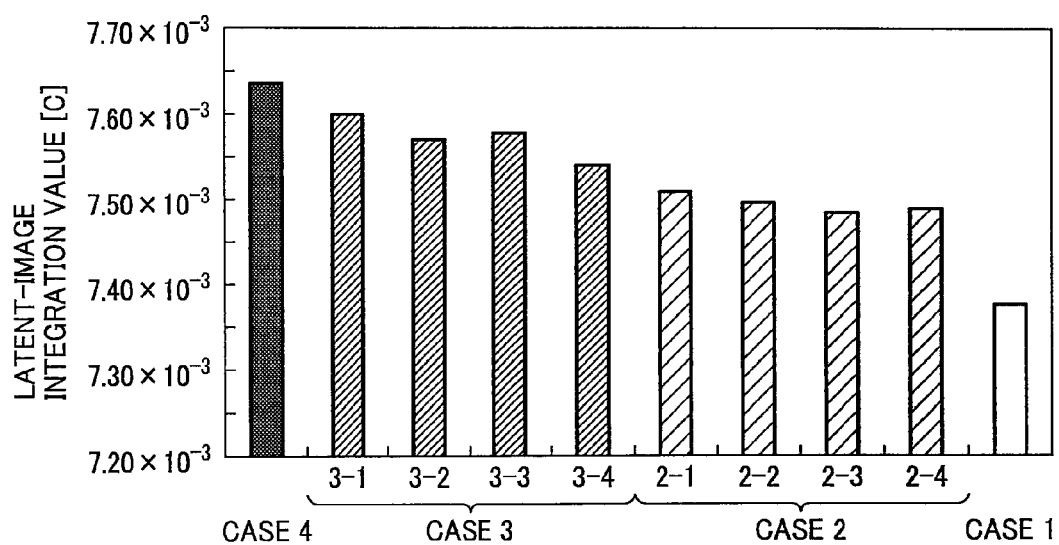
FIG. 20 is a schematic diagram to explain the relation between the number of scans and the latent-image integration value during formation of one pixel.
FIG. 21 is a schematic diagram to explain a case 1 of FIG. 20.

FIG. 20 is a graphical representation of the latent-image integration values when one pixel is formed by four light spots arranged in a line in the sub-scanning direction when the number of scans is one (case 1, see FIG. 21), when the number of scans is two (case 2, see FIG. 22), when the number of scans is three (case 3, see FIG. 23), and when the number of scans is four (case 4, see FIG. 24).

Thus, it can be surmised that the smaller the number of scans, the smaller the latent-image integration value, and that the latent-image integration value when the pixel is subjected to single scan (case 1) is particularly small compared to when the pixel is subjected to multiple scans (cases 2 to 4).

Thus, coexistence of pixels that have been scanned once and pixels that have been scanned multiple times, as in the conventional technology, results in significant variation in the latent-image integration values, thus leading to density unevenness in the output image.

However, in the present embodiment, as shown in FIG. 25A and FIG. 25B, because one pixel is formed by two scans, there is negligible variation in the latent-image integration values, and therefore, no density unevenness in the output image. In other words, enhanced image quality can be realized.

Further, drive data is the same for all four light emitting units that emit the four light beams to form a pixel. Consequently, the amount of data, and hence, the usage of memory space can be reduced.

Even if there is variation in luminescence quantum of each of the four light emitting units that emit the four light beams to form a pixel, it is averaged out in the pixel. Consequently, density unevenness of the image due to variation in the luminescence quantum can be reduced.

The CPU 210 selects the light emitting unit corresponding to the first light spot of one pixel based on the shift amount Δh, so that shift in the sub-scanning direction can be appropriately corrected. Thus, the scan line can be controlled by a precision of one-fourth pixel. Consequently, enhanced accuracy of the position of the light spot in the sub-scanning direction can be achieved. When the light emitting unit corresponding to the first light spot is selected, the light emitting units corresponding to the remaining three light spots of the pixel are automatically selected.

Thus, the laser printer 1000 according to the present embodiment includes the light source 14 having 40 light emitting units, the polygon mirror 13 that deflects the light beam from the light source 14, the scanning optical system that focuses the deflected light beam, and the photosensitive drum 1030, which is located at a focal position where the scanning optical system focuses the light beam, and whose surface is scanned in the main scanning direction by the focused light beam. One pixel of the image is formed on the photosensitive drum 1030 by a plurality of light spots that have different focal positions in at least the sub-scanning direction, wherein, of the plurality of light spots, at least one light spot has a different scan timing than the remaining light spots.

In the laser printer 1000 according to the present embodiment, each pixel is compulsorily scanned multiple times. Consequently, variation in the latent-image integration values can be reduced as compared to when there is coexistence of pixels that have been scanned once and pixels that have been scanned multiple times. As a result, as compared to conventional technology, density unevenness in the output image can be reduced. Thus, high quality image can be realized without cost increase.

In the present embodiment, the two-dimensional array 100 has 40 light emitting units. However, the number of light emitting units can vary and can be more or less than 40 as desired.

Figure 26:
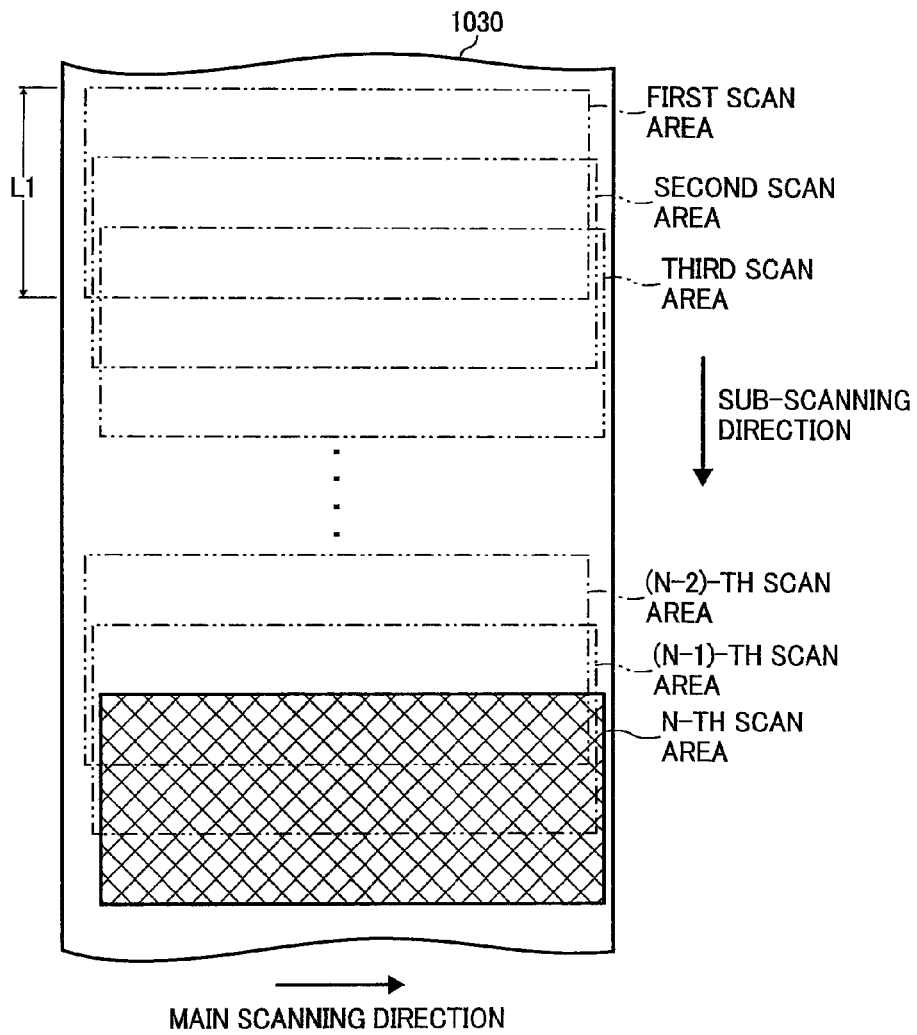
FIG. 26 is a schematic diagram to explain secondary jump scanning.

In the present embodiment, primary jump scan is adopted. However, as shown in FIG. 26, it is also possible to adopt secondary jump scan, in which preferred write density is obtained by scanning thrice. However, the array area of the light emitting units will increase and therefore the optical characteristics will degrade with the increase in the degree of scanning.

In the present embodiment, a photosensitive drum is used as an image carrying member. However, any image carrying member in which reciprocatory failure can potentially occur can be used with same effectiveness.

The image forming apparatus need not be limited to the laser printer 1000.

Figure 27:
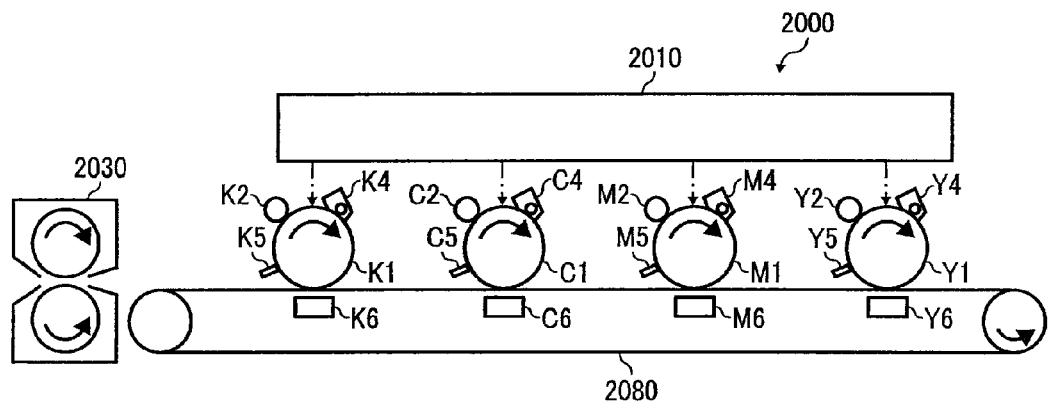
FIG. 27 is a schematic diagram of a color printer.

The image forming apparatus, for instance, can be a color printer 2000 having a plurality of photosensitive drums, as shown in FIG. 27.

The color printer 2000 is a tandem-type full color printer that forms a full color image by superimposing four toner color images (black, cyan, magenta, and yellow). The color printer 2000 includes one set of photosensitive drum K1, charging device K2, developing device K4, cleaning unit K5, and transfer device K6 for a black toner, one set of photosensitive drum C1, charging device C2, developing device C4, cleaning unit C5, and transfer device C6 for a cyan toner, one set of photosensitive drum M1, charging device M2, developing device M4, cleaning unit M5, and transfer device M6 for a magenta toner, and one set of photosensitive drum Y1, charging device Y2, developing device Y4, cleaning unit Y5, and transfer device Y6 for a yellow toner, an optical scanning device 2010, a transfer belt 2080, and a fixing unit 2030.

Each photosensitive drum rotates in the direction of the arrow shown in FIG. 27. One set of charging device, the developing device, the transfer device, and the cleaning unit is arranged around each photosensitive drum. Each charging device uniformly charges the surface of its corresponding photosensitive drum. Light from the optical scanning device exposes the charged surface of each photosensitive drum to form an electrostatic latent image. Each developing device develops the latent image on its corresponding photosensitive drum to a toner image. Each transfer device transfers the respective toner image to a recording paper. Finally, the fixing unit 2030 fixes the image to the recording paper.

The optical scanning device 2010 includes, for each toner color, a light source, a synchronization detection sensor, a pre-deflector optical system, and a scanning optical system, which are functionally identical to the light source 14, the synchronization detection sensor 18, the pre-deflector optical system, and the scanning optical system, respectively, of the optical scanning device 1010.

The light beam emitted by each light source passes through the pre-deflector optical system, is deflected by the polygon mirror, passes through the scanning optical system, and exposes the corresponding photosensitive drum.

The optical scanning device 2010 includes a scan control device, which in a similar manner to the scan control device 22, determines the shift amount Δh for each photosensitive drum based on the output signal of each synchronization detection sensor. Based on the shift amount Δh, the scan control device selects the light emitting device corresponding to the first spot of one pixel such that the position shift in the sub-scanning direction is appropriately corrected.

As in the laser printer 1000, in the color printer 2000 too, one pixel of an image is formed by a plurality of light spots that have different focal positions in at least the sub-scanning direction. The color printer 2000 too performs primary jump scanning and forms a pixel by scanning twice. Consequently, the color printer 2000 demonstrates the same effect as the laser printer 1000.

In the color printer 2000, the position shift of each toner image in the sub-scanning direction is corrected. Consequently, there is reduced color shift in the output image.

In the color printer 2000, one optical scanning device can be provided for each color or for two colors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that forms an image with a light beam modulated by image data, the image forming apparatus comprising:
    a light source that includes a plurality of light emitting units and outputs a light beam;
    a deflector that deflects the light beam from the light source;
    a scanning optical system that focuses the light beam deflected by the deflector; and
    an image carrying member that is located at a focal position of the light beam and includes a surface that is scanned in a main scanning direction with the light beam focused by the scanning optical system,
    wherein each individual pixel of the image is formed by a plurality of light spots having different focal positions in at least a sub-scanning direction;
    each individual pixel is scanned at least twice in the main scanning direction, such that, for each individual pixel, at least one light spot forming part of a single pixel is formed on the surface of the image carrying member during one of the at least two scans that is different from ones of the at least two scans during which the rest of the plurality of light spots forming part of the single pixel are formed;
    wherein the light emitting units are surface-emitting lasers, and the light source is a two-dimensional surface-emitting laser array; and
    wherein the image carrying member is scanned along a plurality of scan lines by a plurality of light beams at one time of scanning, and $(k-1) \times L2 < L1$ is satisfied, where k is a number of light emitting units in the surface-emitting laser array, L1 is a distance between two scan lines at both ends from among the scan lines, and L2 is a distance between two adjoining scan lines.

2. The image forming apparatus according to claim 1, further comprising: a control device that selects a light emitting unit appropriate for a position deviation in the sub-scanning direction from among the light emitting units as a light emitting unit corresponding to at least one light spot formed on the surface of the image carrying member first from among the light spots.

3. The image forming apparatus according to claim 1, wherein the distance L1 is smaller than $(2k-1) \times L2$.

4. The image forming apparatus according to claim 1, wherein the image data is multi-color image data.

5. An image forming apparatus that forms an image with a light beam modulated by image data, the image forming apparatus comprising:
    a light source that includes a plurality of light emitting units and outputs a light beam, wherein the light emitting units are surface-emitting lasers and the light source is a two-dimensional surface-emitting laser array;
    a deflector that deflects the light beam from the light source;
    a scanning optical system that focuses the light beam deflected by the deflector; and
    an image carrying member that is located at a focal position of the light beam and includes a surface that is scanned in a main scanning direction with the light beam focused by the scanning optical system, wherein
    each pixel of the image is formed by a plurality of light spots having different focal positions in at least a sub-scanning direction,
    at least one light spot from among the light spots forming each pixel is formed on the surface of the image carrying member at a scan timing different from the rest of the light spots forming the pixel,
    the image carrying member is scanned along a plurality of scan lines by a plurality of light beams at one time of scanning, and
    $(k-1) \times L2 < L1$ is satisfied, where k is a number of light emitting units in the surface-emitting laser array, L1 is a distance between two scan lines at both ends from among the scan lines, and L2 is a distance between two adjoining scan lines.

6. The image forming apparatus according to claim 5, wherein the distance L1 is smaller than $(2k-1) \times L2$.

7. The image forming apparatus according to claim 5, further comprising: a control device that selects a light emitting unit appropriate for a position deviation in the sub-scanning direction from among the light emitting units as a light emitting unit corresponding to at least one light spot formed on the surface of the image carrying member first from among the light spots.

8. The image forming apparatus according to claim 5, wherein the image data is multi-color image data.

* * * * *